P. J. SMITH.
BOLSTER MECHANISM FOR MOTOR VEHICLES.
APPLICATION FILED MAY 31, 1913.
1,112,663.   Patented Oct. 6, 1914.
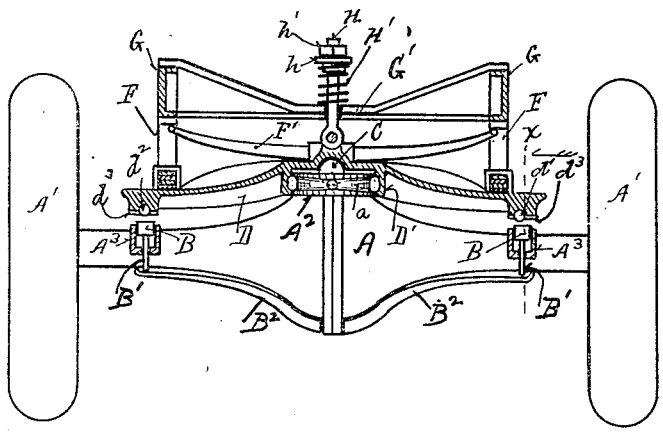
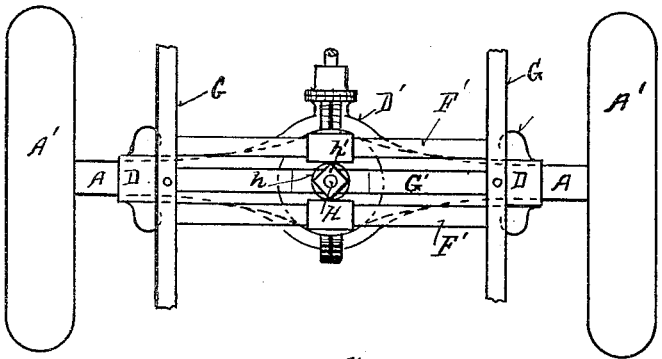
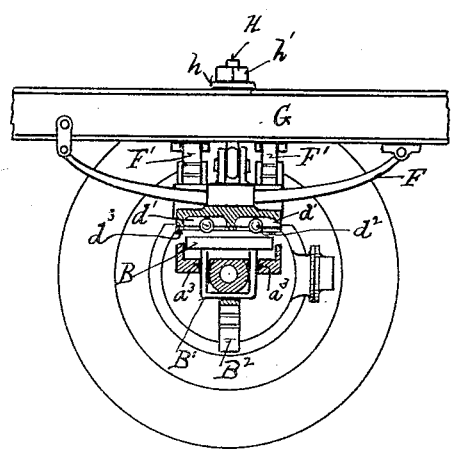
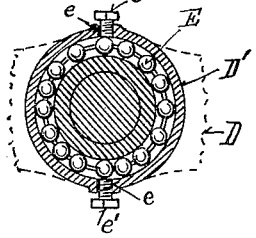
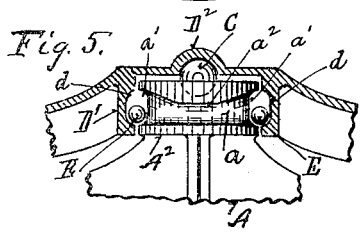
Witnesses
Inventor,
Paul J. Smith

UNITED STATES PATENT OFFICE.

PAUL J. SMITH, OF GALETON, PENNSYLVANIA.

BOLSTER MECHANISM FOR MOTOR-VEHICLES.

1,112,663.  Specification of Letters Patent.  Patented Oct. 6, 1914.

Application filed May 31, 1913. Serial No. 771,099.

*To all whom it may concern:*

Be it known that I, PAUL J. SMITH, a citizen of the United States, residing at Galeton, in the county of Potter and State of Pennsylvania, have invented certain new and useful Improvements in Bolster Mechanism for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to motor vehicles, and has for its object the construction of bolster mechanism adapted for use upon motor vehicles of the four wheel drive and steering type.

The features of my invention are hereinafter pointed out and explained, and are illustrated in the accompanying drawings, in which:—

Figure 1, is a view in elevation and partially in transverse central section of my improved bolster mechanism. Fig. 2, is a top or plan view of the same. Fig. 3, is a vertical section on the line X—X in Fig. 1, looking in the direction of the arrow. Fig. 4, is an enlarged horizontal section of a fragment thereof. Fig. 5, is an enlarged vertical section similar to the view in Fig. 1.

In these drawings A, indicates a hollow axle and gear housing, and A′, indicates the wheels. On the upper side of the central portion of the hollow axle A, I provide a circular disk A², having a groove $a$, around its periphery, which groove is widest at the sides $a'$, thereof, toward each of the wheels A′, than at the front and back $a^2$. At the central part of the upper surface of the disk A², I make a semi-spherical depression as shown by broken lines in Fig. 5.

Adjacent to each end of the hollow axle A, I provide box like receptacles A³, having openings $a^3$, through the bottoms thereof. In these receptacles A³, I place side bearing blocks B, which are provided with U-shaped guides B′, which extend downwardly through the opening $a^3$, and around the lower side of the axle A.

Secured to the under side of the hollow axle A, I provide springs B², which press upwardly against the U-shaped guides B′, thereby maintaining the side bearing blocks B, in their upper-most position.

In the semi-spherical depression in the top of the disk A², I place a pivot, preferably a ball, C. Upon the pivot ball C, I place a bolster D, having in the central part thereof an inverted cylindrical chamber D′, which chamber is provided with an inverted semi-spherical depression D², adapted to fit over the pivot ball C. Around the internal wall of the chamber D′, I provide a groove $d$, the width of said groove being equal to the widest portion $a'$, of the groove $a$, around the periphery of the disk A², the grooves $a$ and $d$, forming a race-way for balls E (see Figs. 4 and 5) placed therein.

The bolster D, extends over the axle A, toward each wheel A′, and terminates over the side bearing blocks B, and is provided in the under side thereof with transverse grooves $d'$, adapted to receive balls $d^2$, which are retained in place in said grooves by means of slotted plates $d^3$, secured on the under side of the bolster, which permit the balls $d^2$, to extend slightly below the under surface of said plates.

Upon the upper sides of the end portions of the bolster D, I place transverse springs F, and upon the central portion of the bolster D, I preferably place additional springs F′, which extend over the bolster D. Upon the ends of the springs F, and F′, I place the side bars G, of the body frame of the vehicle and connect the side bars G, by means of transverse bars G′.

To the top of the bolster D, I secure an eye bolt H, which passes upwardly therefrom through an opening in the transverse bars G′. Upon this eye bolt H, I place a spring H′, which rests upon the transverse bars G′, and above the spring H′, on the bolt H, I place a washer $h$, and nut $h'$, which bolt H, and spring H′, control the rebound of the springs F, and F′. In order to get the balls E, into the grooves $a'$ and $d$, I provide openings $e$, in the walls of the chamber D′, (see Fig. 4,) and after the bolster D, is in place upon the axle A, the balls E, are inserted through the openings $e$, into said grooves $a'$, and $d$, then the openings $e$, are closed by means of the plugs $e'$.

The operation of the narrow portion $a^2$, of the groove $a$, is to prevent the axle A, from rocking upon its axis while the widened portion $a'$, of the grooves $a$, permits the axle A, to rock laterally upon the pivot ball C, while the balls E, operate in conjunction with the grooves $a'$, and $d$, to prevent the bolster D, from being lifted upwardly off of the disk A². When the bolster D rocks laterally upon the pivot ball C, the balls $d^2$, in the ends thereof contact with the spring pressed side bearing blocks B, which limit the side movement of the body of the vehicle.

Having thus shown and described my invention so as to enable others to utilize the same, what I claim as new and desire to secure by Letters Patent, is:—

1. The combination in a device of the character described of a vehicle axle, a disk on the upper side thereof having a groove around its periphery of greater width over the axle than at the front and back of said disk, a bolster, a depending cylindrical flange thereon adapted to embrace the periphery of said disk, and having an annular groove of greater width at the sides than at the front and back thereof adapted to coincide with the groove around the periphery of said disk, a supporting pivot interposed between said axle and bolster, and a series of balls in said grooves, whereby said axle and bolster are locked together and lateral movement with relation to each other permitted, substantially as and for the purpose set forth.

2. In a device of the character described, an axle member, a disk on the upper side of the middle portion thereof having a groove around its periphery, a pivot ball centrally placed on said disk, side bearing surfaces adjacent to the ends of said axle member, a bolster member having a depending cylindrical flange forming a chamber at its middle portion adapted to embrace said disk, and provided with an endless groove in its interior wall, adapted to coincide with the groove in said disk, side bearing surfaces on the under side of said bolster member adapted to contact with the side bearing surfaces on said axle member, and a series of balls in the said grooves between the periphery of said disk and the inner wall of said chamber whereby said axle and bolster are locked together substantially as set forth.

3. The combination in a device of the character described, of an axle member, a disk on the upper side thereof having a groove around its periphery, said groove being wider at the sides of said disk toward the ends of the axle than at its front and back portions; spring pressed side bearing blocks on the upper side of said axle member; a pivot ball mounted on said disk; a bolster member, a depending cylindrical flange adapted to embrace said disk, and having an endless groove in the inner surface thereof, adapted to coincide with the groove in the periphery of said disk; a series of balls in said grooves adapted to lock said axle and bolster members together; side bearings on the ends of said bolster member having ball grooves in the under surface thereof; balls in said grooves adapted to engage said spring pressed blocks, and slotted plates secured on the under side of said side bearings adapted to retain said balls in said grooves; substantially as set forth.

In testimony whereof I affix my signature, in presence of two witnesses.

PAUL J. SMITH.

Witnesses:
W. H. WARD,
J. A. CONNERS.

---

Copies of this patent may be obtained for five cents each, by addressing the "Commissioner of Patents, Washington, D. C."